(12) United States Patent
Lin

(10) Patent No.: US 12,488,841 B2
(45) Date of Patent: Dec. 2, 2025

(54) CURRENT SENSING CIRCUIT USING PROPORTIONAL CURRENT MIRRORS

(71) Applicant: Winbond Electronics Corp., Taichung (TW)

(72) Inventor: Hung-Hsueh Lin, Taichung (TW)

(73) Assignee: Winbond Electronics Corp., Taichung (TW)

( * ) Notice: Subject to any disclaimer, the term of this patent is extended or adjusted under 35 U.S.C. 154(b) by 184 days.

(21) Appl. No.: 18/465,185

(22) Filed: Sep. 12, 2023

(65) Prior Publication Data

US 2024/0379173 A1 Nov. 14, 2024

(30) Foreign Application Priority Data

May 8, 2023 (TW) .................................. 112117049

(51) Int. Cl.
| | | |
|---|---|---|
| *G11C 16/28* | (2006.01) | |
| *G11C 7/06* | (2006.01) | |
| *G11C 7/14* | (2006.01) | |
| *G11C 11/4063* | (2006.01) | |
| *G11C 13/00* | (2006.01) | |

(52) U.S. Cl.
CPC ................ *G11C 16/28* (2013.01); *G11C 7/06* (2013.01); *G11C 7/062* (2013.01); *G11C 7/14* (2013.01); *G11C 11/4063* (2013.01); *G11C 13/004* (2013.01); *G11C 2013/0042* (2013.01); *G11C 2013/0054* (2013.01)

(58) Field of Classification Search
CPC ........... G11C 16/28; G11C 7/06; G11C 7/062; G11C 7/14; G11C 11/4063; G11C 13/004; G11C 2013/0042; G11C 2013/0054; G11C 11/4074; G11C 11/4091; H03F 3/45475
See application file for complete search history.

(56) References Cited

U.S. PATENT DOCUMENTS 6,433,590 B1 * 8/2002 Lee .................. G11C 7/062
327/51
7,660,161 B2 2/2010 Van Tran
(Continued)

FOREIGN PATENT DOCUMENTS

| | | |
|---|---|---|
| CN | 108492840 | 11/2020 |
| TW | 202219948 | 5/2022 |

OTHER PUBLICATIONS

"Office Action of Taiwan Counterpart Application", issued on Jun. 20, 2024, p. 1-p. 7.

*Primary Examiner* — Donald HB Braswell
(74) *Attorney, Agent, or Firm* — JCIPRNET

(57) ABSTRACT

A current sensing circuit including a differential sensing amplifier and a pre-charging circuit is provided. The differential sensing amplifier includes a first input end, a second input end and a output end. The first input end is coupled to a selected cell via a first data line. The second input end is coupled to a reference cell via a second data line. The output end outputs a sensing data of the selected cell. The pre-charging circuit is coupled to the differential sensing amplifier. The pre-charging circuit is configured to provide a pre-charging circuit and perform a pre-charging operation on the first data line. The first data line has a cell current and the pre-charging circuit. The second data line has a reference current. The pre-charging circuit is determined according to the reference current.

14 Claims, 4 Drawing Sheets

(56) References Cited

U.S. PATENT DOCUMENTS

| | | |
|---|---|---|
| 10,783,969 B2 | 9/2020 | Sheng et al. |
| 2020/0327921 A1* | 10/2020 | Takeda ................ G11C 11/4091 |
| 2020/0388333 A1* | 12/2020 | Lin ........................ G11C 7/062 |

\* cited by examiner

CURRENT SENSING CIRCUIT USING PROPORTIONAL CURRENT MIRRORS

CROSS-REFERENCE TO RELATED APPLICATION

This application claims the priority benefit of Taiwan application serial no. 112117049, filed on May 8, 2023. The entirety of the above-mentioned patent application is hereby incorporated by reference herein and made a part of this specification.

BACKGROUND

Technical Field

The invention relates to an electronic circuit, and in particular, to a current sensing circuit.

Description of Related Art

The reading operation of memory storage devices (such as flash memory) is performed by sensing the data stored in the array cell through a current sensing circuit that compares the currents of the array cell and the reference cell. The cell current and reference current generate input signals through the load resistors of the current-to-voltage converter, and are transmitted to a differential sensing amplifier to read out the data stored in the cell.

In order to speed up the sensing operation, it is necessary to reduce the establishment time of sensing bias in the two current paths of cell current and reference current under the condition of heavy load on the data line. In the prior art, pre-charging is used to accelerate the sensing operation. However, excessive pre-charging may cause erroneous sensing results and waste more sensing time waiting for the sensing bias of the data line to return to the correct sensing data.

SUMMARY

The invention provides a current sensing circuit that can accelerate sensing operations and accurately read stored data.

The current sensing circuit of the present invention includes a differential sensing amplifier and a pre-charging circuit. The differential sensing amplifier has a first input end, a second input end and a output end. The first input end is coupled to a selected cell via a first data line. The second input end is coupled to a reference cell via a second data line. The output end outputs a sensing data of the selected cell. The pre-charging circuit is coupled to the differential sensing amplifier. The pre-charging circuit is configured to provide a pre-charging circuit and perform a pre-charging operation on the first data line. The first data line has a cell current and the pre-charging circuit. The second data line has a reference current. The pre-charging circuit is determined according to the reference current.

In an embodiment of the present invention, the differential sensing amplifier outputs an output voltage as the sensing data based on a comparison result of the sensing voltage and the reference voltage.

In an embodiment of the present invention, the current sensing circuit further includes a first current-to-voltage converter circuit and a second current-to-voltage converter circuit. The first current-to-voltage converter circuit is coupled between the first input end and the selected cell. The first current-to-voltage converter circuit is configured to convert the cell current and the pre-charging current into a sensing voltage. The second current-to-voltage converter circuit is coupled between the second input end and the reference cell. The second current-to-voltage converter circuit is configured to convert the reference current into a reference voltage.

In an embodiment of the present invention, the pre-charging circuit includes a switch element and a current source. The switch element has a first end, a second end, and a control end. The first end of the switch element is coupled to an operating voltage. The control end of the switch element is coupled to a control signal. The current source has a first end and a second end. The first end of the current source is coupled to the second end of the switch element. The second end of the current source is coupled to the differential sensing amplifier.

In an embodiment of the present invention, the current source includes a first transistor as a current mirror circuit. The second current-to-voltage converter circuit includes a second transistor. The first transistor has a first end, a second end, and a control end. The first end of the first transistor is coupled to the switch element. The second end of the first transistor is coupled to the first input end of the differential sensing amplifier via the first current-to-voltage converter circuit. The control end of the first transistor is coupled to the second transistor.

In an embodiment of the present invention, the current source includes a first transistor as a current mirror circuit. The second current-to-voltage converter circuit includes a second transistor. The first transistor has a first end, a second end, and a control end. The first end of the first transistor is coupled to the switch element. The second end of the first transistor is directly coupled to the first input end of the differential sensing amplifier. The control end of the first transistor is coupled to the second transistor.

In an embodiment of the present invention, the ratio of a channel width to a channel length of the first transistor is m times the ratio of a channel width to a channel length of the second transistor, wherein m is greater than or equal to 1, and the value of m is the ratio of a threshold value set for detecting current to the reference current.

In an embodiment of the present invention, the pre-charging current is the ratio of the reference current to a threshold value set for detecting current.

In an embodiment of the present invention, the pre-charging current is proportional to the reference current.

Based on the above, in the embodiments of the present invention, the pre-charging circuit performs a pre-charging operation on the first data line during the pre-charging period, and the pre-charging current is determined based on the reference current. Therefore, the sensing operation of the current sensing circuit can be accelerated, and the stored data can be read accurately.

In order to make the above-mentioned features and advantages of this invention more apparent and easier to understand, the following implementation examples are provided, along with accompanying diagrams for a detailed explanation.

DESCRIPTION OF THE EMBODIMENTS

Figure 1:
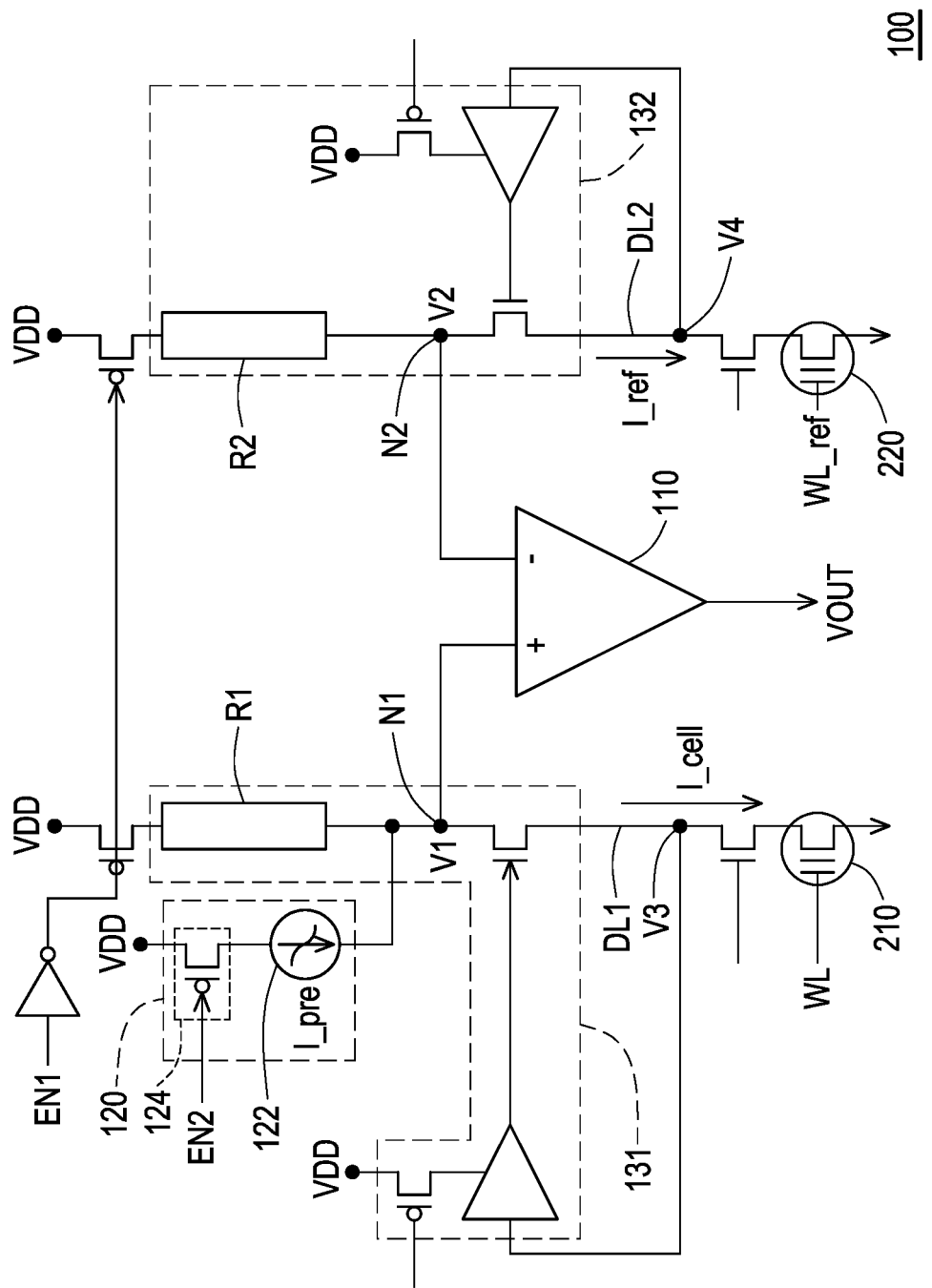
FIGS. 1, 3 and 4 are schematic diagrams of a current sensing circuit in different embodiments of the present invention.

FIG. 1 is a schematic diagram of a current sensing circuit in an embodiment of the present invention. Referring to FIG. 1, the current sensing circuit 100 of the embodiment includes a differential sensing amplifier 110, a pre-charging circuit 120, a first current-to-voltage converter circuit 131, and a second current-to-voltage converter circuit 132. The current sensing circuit 100 is coupled to the operating voltage VDD. The control signal EN1 is configured to control the current sensing circuit 100 to perform a sensing operation on the selected cell 210.

Specifically, the differential sensing amplifier 110 uses the output voltage VOUT of the output end as sensing data according to the comparison result of the sensing voltage V1 and the reference voltage V2. For example, if the sensing voltage V1 is greater than the reference voltage V2, the differential sensing amplifier 110 outputs the high-level output voltage VOUT as sensing data 0; if the sensing voltage V1 is less than or equal to the reference voltage V2, the differential sensing amplifier 110 outputs the output voltage VOUT with a low level as the sensing data 1.

The differential sensing amplifier 110 has a first input end N1, a second input end N2 and an output end. The first input terminal N1 serves as the non-inverting input terminal of the differential sensing amplifier 110, and the second input terminal N2 serves as the inverting input terminal of the differential sensing amplifier 110. The output terminal is configured to output the sensing data of the selected cell 210.

The first input end N1 is coupled to the selected cell 210 via a first data line DL1. The first data line DL1 has a cell current I_cell and a pre-charging current I_pre. The cell current I_cell and the pre-charging current I_pre are delivered on the first data line DL1. The cell current I_cell comes from the selected cell 210. The second input end N2 is coupled to a reference cell 220 via a second data line DL2. The second data line DL2 has a reference current I_ref. The reference current I_ref is delivered on the second data line DL2. The reference current I_ref comes from the reference cell 220. In the embodiment, the pre-charging current I_pre is provided by the pre-charging circuit 12, and the pre-charging current I_pre is determined according to the reference current I_ref. In addition, in the embodiment, WL is a word line coupled to the selected cell 210, and WL_ref is a word line coupled to the reference cell 220.

The first current-to-voltage converter circuit 131 is coupled between the first input terminal N1 and the selected cell 210. The first current-to-voltage converter circuit 131 includes a first resistor R1 as a load. The first current-to-voltage converter circuit 131 is configured to convert the cell current I_cell and the pre-charging current I_pre into the sensing voltage V1. The second current-to-voltage converter circuit 132 is coupled between the second input terminal N2 and the reference cell 220. The second current-to-voltage converter circuit 132 includes a second resistor R2 as a load. The second current-to-voltage converter circuit 132 is configured to convert the reference current I_ref into the reference voltage V2. The first resistor R1 is equal to the second resistor R2 multiplied by the ratio of the cell current I_cell to the reference current I_ref. It can also be set so that the ratio of the first resistor R1 to the second resistor R2 is equal to the ratio of the cell current I_cell to the reference current I_ref.

In the embodiment, the pre-charging circuit 120 is coupled to the differential sensing amplifier 110, and is configured to provide the pre-charging current I_pre to perform a pre-charging operation on the first data line DL1. The pre-charging circuit 120 includes a current source 122 and a switch element 124. The current source 122 is coupled to the switch element 124. The switch element 124 has a first end, a second end and a control end. The first end of the switch element 124 is coupled to the operating voltage VDD. The control end of the switch element is coupled to the control signal EN2. The current source 122 has a first end and a second end. The first end of the current source 122 is coupled to a second end of the switch element 124. The second end of the current source 122 is coupled to the differential sensing amplifier. The current source 122 is configured to provide the pre-charging current I_pre. The control signal EN2 is configured to control the conduction state of the switch element 124 to determine the time length of the pre-charging period. During the pre-charging period, the control signal EN2 can make the switch element 124 turn on, and the current source 122 outputs the pre-charging current I_pre, so as to perform pre-charging operation on the first data line DL1 of the selected cell 210.

In the embodiment, the two current paths of the selected cell 210 and the reference cell 220 are connected to the respective loads in the current-to-voltage converter circuit, and the output thereof is passed to the differential sensing amplifier 110 for data reading operation. The pre-charging circuit 120 is configured to perform a pre-charging operation on the current path of the selected cell 210, such as providing the pre-charging current I_pre to the current path of the selected cell 210. The pre-charging current I_pre provided by the pre-charging circuit 120 can be equal to the reference current I_ref, or proportional to the reference current I_ref, that is, I_pre=m×I_ref. Among them, m is greater than or equal to 1, which is the ratio of a threshold value set for detecting current to the reference current During the pre-charging period, the pre-charging circuit 120 can pre-charge the sensing bias voltage on the first data line DL1 (i.e., the voltage of the node N1) to a predetermined voltage level. Since the pre-charging current I_pre is proportional to the reference current I_ref, the voltage of node N1 can have a certain degree of correlation with the reference voltage V2. In this way, the pre-charging bias voltage V1 on the first data line DL1 can be prevented from being affected by the process, voltage, temperature (referred to as PVT) and the length of the pre-charging period from deviating from the correlation with the reference voltage V2, so that the differential sensing amplifier 110 outputs incorrect sensing results. In an embodiment, the pre-charging circuit 120 may include a current mirror circuit for mapping the reference current I_ref to the pre-charging current I_pre so that the pre-charging current I_pre is proportional to the reference current I_ref.

In the initial state after the pre-charging period, the sensing voltage V1 and the reference voltage V2 converted from the first current-to-voltage converter circuit 131 and the second current-to-voltage converter circuit 132 are close to reading 0, that is, the output result of detecting that the cell current I_cell is smaller than the reference current I_ref. Moreover, the signal sensed by the differential sensing amplifier 110 is a near-zero differential input signal (well-biased differential input signal) generated by a preset bias voltage based on the detection current threshold value. Therefore, in the case of heavy load, the pre-charging operation of the embodiment can reduce the settling time of the sensing bias voltage (voltage of node N1) of the first data line DL1 and prevent the voltage of node N1 from being over pre-charging. In the case of over pre-charging, more recovery time is required to pull the voltage of the node N1 back to the real sensing bias voltage by the cell current, and thus, the reading performance of the current sensing circuit 100 will be reduced.

Figure 2:
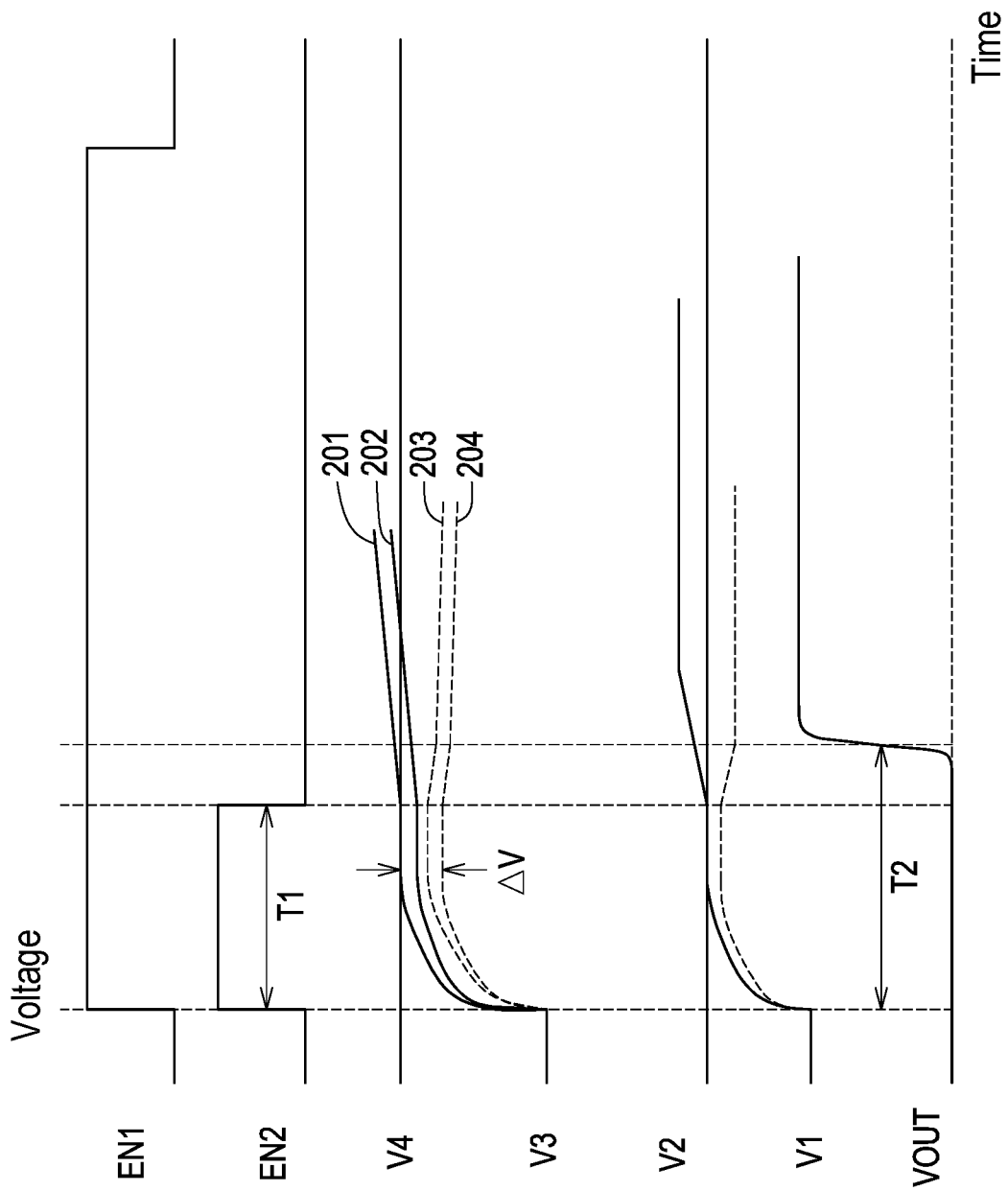
FIG. 2 is a schematic diagram of signal waveforms in a current sensing circuit in an embodiment of the present invention.

FIG. 2 is a schematic diagram of signal waveforms in a current sensing circuit in an embodiment of the present invention. Referring to FIG. 1 and FIG. 2, when the control signal EN1 is in a high-level state, the current sensing circuit 100 performs a reading operation on the selected cell 210. During the pre-charging period T1, the control signal EN2 is in a high-level state, and the pre-charging circuit 120 performs a pre-charging operation on the first data line DL1 of the selected cell 210.

During the pre-charging period T1, when the cell current I_cell is 0, the voltage signal V3 will be approximately equal to the voltage signal V4 after reaching the initial state of pre-charging, as shown in the signal waveform 201. Wherein, the signal waveform 201 shows that the selected cell 210 stores a bit value of 1, and the current I_cell is smaller than the reference current I_ref. Alternatively, during the pre-charging period T1, when the current of the selected cell 210 is less than the reference current I_ref, the voltage signal V3 will remain lower than the voltage signal V4 after reaching the initial state of pre-charging, as shown by the signal waveform 202. The voltage difference can be determined by the setting of the pre-charging current I_pre. Wherein, the signal waveform 202 shows that the selected cell 210 stores a bit value of 1, and the cell current I_cell is smaller than and close to the reference current I_ref.

On the other hand, the signal waveforms 203 and 204 show that the selected cell 210 stores a bit value of 0, and the cell current I_cell is greater than the reference current I_ref. In the embodiment, during the pre-charging period T1, the difference between the voltage signal V3 and the voltage signal V4 after reaching the pre-charging initial state may be a maximum voltage difference $\Delta V$, as shown in the signal waveform 204. The voltage difference $\Delta V$ is determined according to the difference between the cell current I_cell and the pre-charging current I_pre. By setting the pre-charging current I_pre, the minimum value of the voltage difference can be determined for the range of the cell current I_cell storing bit value 0, so that the pre-charged voltage signal V3 is lower than the voltage signal V4.

Therefore, in the embodiment, by mapping the reference current I_ref to the pre-charging current I_pre, the voltage signal V3 and the voltage signal V4 can maintain a certain relationship. And when reading the selected cell 210 storing a bit value of 0, that is, the cell current I_cell is greater than the reference current I_ref, the pre-charged voltage signal V3 is kept lower than the voltage signal V4 by the voltage difference $\Delta V$, so that the voltage signal V3 does not have the risk of over pre-charging during the pre-charging period T1.

After the pre-charging period T1, the operation timing of the current sensing circuit 100 enters the sensing period. Since the pre-charging circuit 120 has pre-charged the first data line DL1 of the selected cell 210, the differential sensing amplifier 110 can quickly sense the input voltage at its input terminal, that is, the sensing voltage V1 and the reference voltage V2. No matter in the example of reading 0 or reading 1, the current sensing circuit 100 can quickly read the sensing voltage V1 and reduce its sensing time T2.

Figure 3:
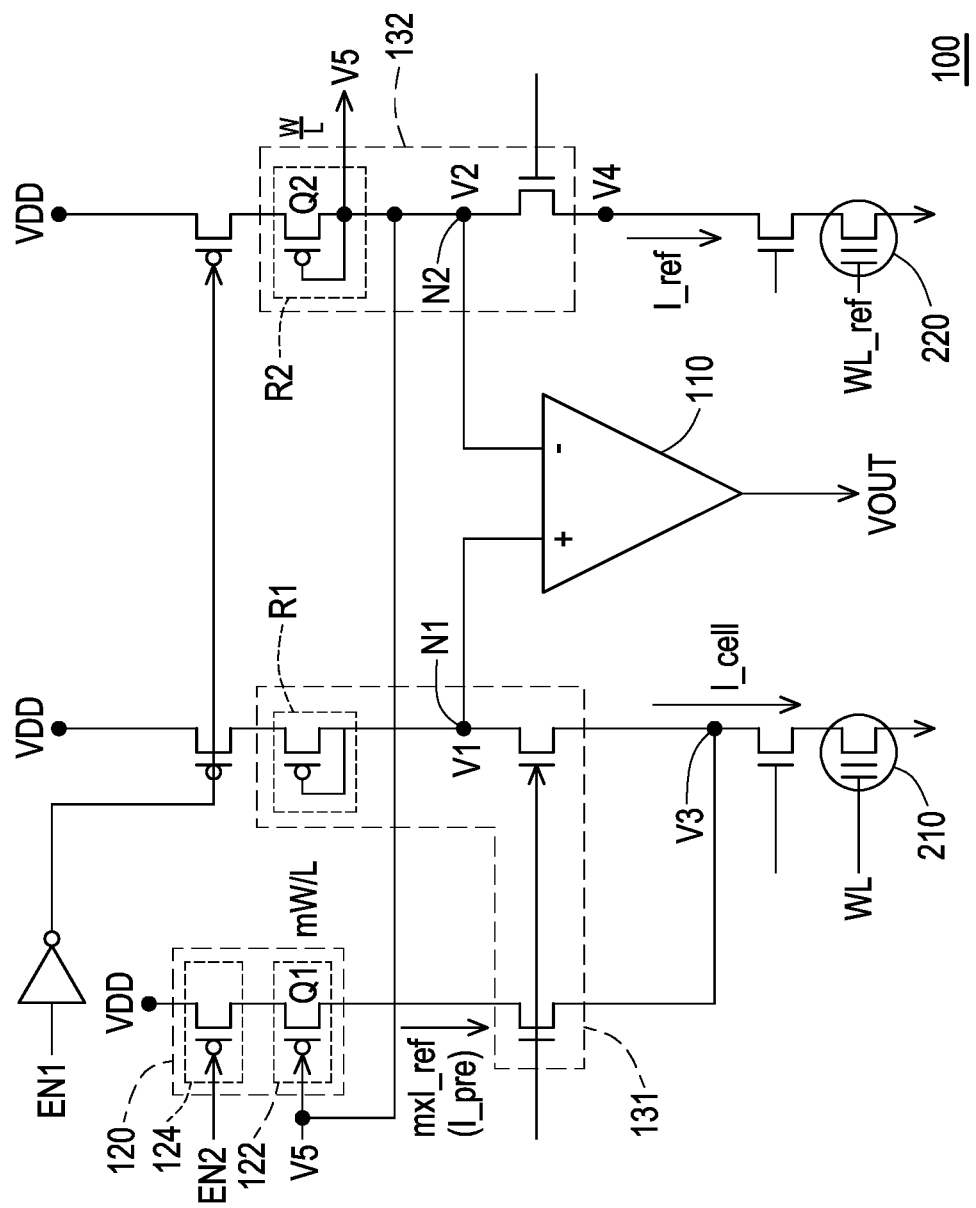

FIG. 3 is a schematic diagram of a current sensing circuit in another embodiment of the present invention. Referring to FIG. 3, the current source 122 of the embodiment is implemented in the form of a current mirror circuit. Specifically, the current source 122 includes a first transistor Q1 as the current mirror circuit, and the second resistor R2 includes a second transistor Q2. The first transistor Q1 has a first end, a second end, and a control end. The first end of the first transistor Q is coupled to the switch element 124, the second end of the first transistor Q1 is coupled to a node N1 (that is, the first input end of the differential sensing amplifier 110) via the first current-to-voltage converter circuit 131, and the control end of the first transistor Q1 is coupled to one end of the second transistor Q2. The end of the second transistor Q2 outputs a control voltage V5 to the control end of the first transistor Q1 to control the current source 122 to output the pre-charging current I_pre.

In the embodiment, the ratio of a channel width W1 of the first transistor Q1 to a channel length L1 can be designed as m times the ratio of a channel width W2 of the second transistor Q2 to the channel length L1, i.e., mW1/L1=W2/L2, wherein W1/L1=W2/L2. Therefore, the pre-charging current I_pre generated by the current mirror 122 through mapping can be proportional to the reference current I_ref, that is, I_pre=m×I_ref.

Figure 4:
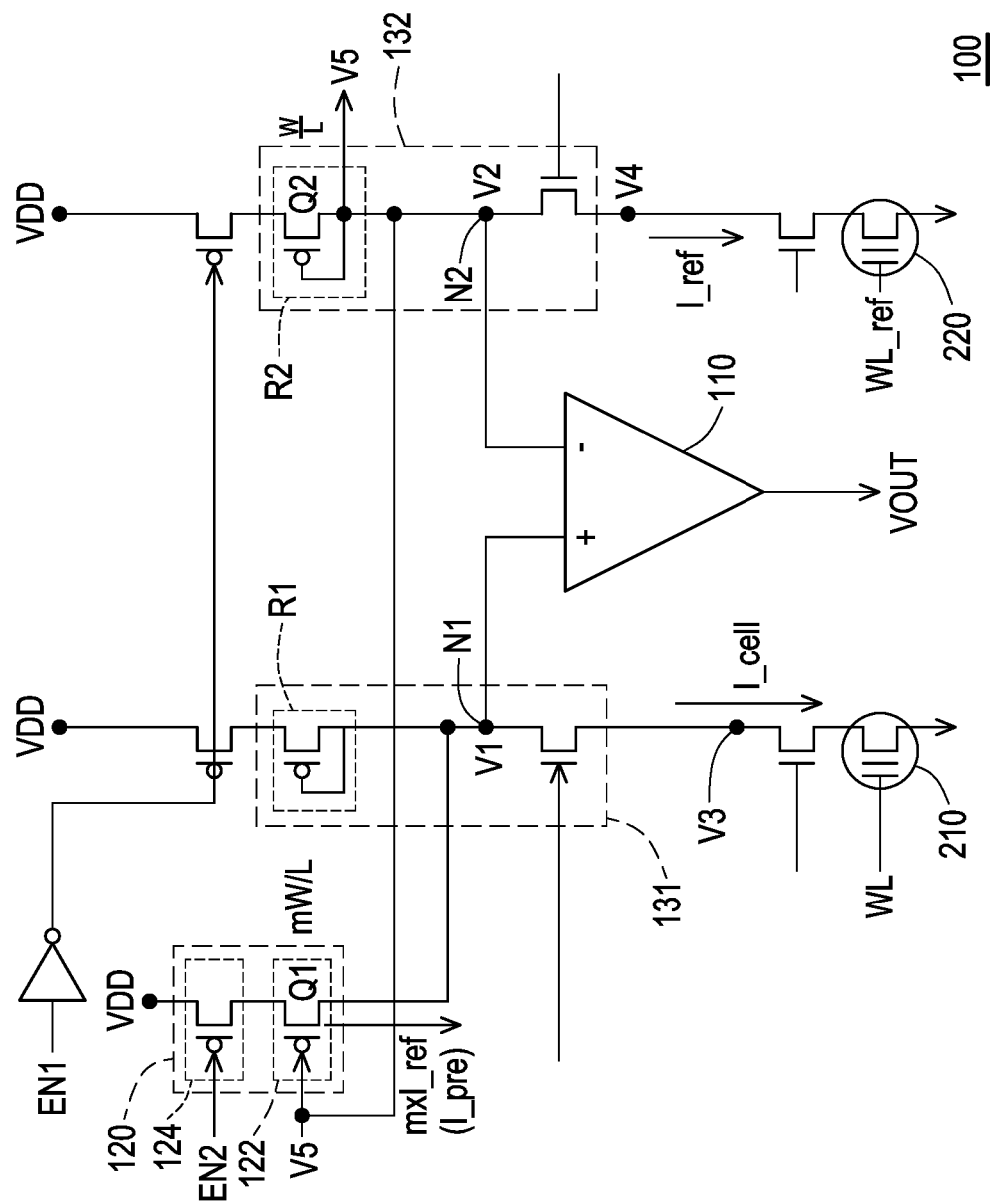

FIG. 4 is a schematic diagram of a current sensing circuit in another embodiment of the present invention. Referring to FIG. 4, the current source 122 of the embodiment is also implemented in the form of a current mirror circuit. Specifically, the current source 122 includes a first transistor Q1. The first transistor Q1 has a first end, a second end, and a control end. The first end of the first transistor Q1 is coupled to the switch element 124, the second end of the first transistor Q1 is directly coupled to the node N1, and the control end of the first transistor Q1 is coupled to one end of the second transistor Q2. The end of the second transistor Q2 outputs a control voltage V5 to the control end of the first transistor Q1 to control the current source 122 to output the pre-charging current I_pre.

In summary, in the embodiment of the present invention, the pre-charging circuit performs a pre-charging operation on the first data line during the pre-charging period. The pre-charging circuit can pre-charge the sensing bias voltage on the first data line to a predetermined voltage level. The pre-charging circuit uses a current mirror circuit to map the reference current to the pre-charging current so that the pre-charging current is proportional to the reference current. Since the pre-charging current is proportional to the reference current, there can be a degree of correlation between the sensing bias voltage and the reference voltage. In this way, it is possible to prevent the pre-charging bias voltage on the first data line from being affected by the process, voltage, temperature, and pre-charging time length from deviating from the correlation with the reference voltage, thereby causing the differential sensing amplifier to output incorrect sensing results. Besides, under heavy load conditions, the pre-charging operation can reduce the settling time of the sensing bias of the first data line and prevent the sensing bias node from being over pre-charging. Therefore, the pre-charging circuit can speed up the sensing operation of the current sensing circuit, and the current sensing circuit can correctly read the stored data.

Although the present invention has been disclosed in the above embodiments, it is not intended to limit the invention. Those skilled in the art can make minor modifications and refinements without departing from the spirit and scope of the present invention. Therefore, the scope of protection of the present invention shall be defined by the appended claims of the patent application.

What is claimed is:

1. A current sensing circuit, comprising:
a differential sensing amplifier, comprises a first input end, a second input end and an output end, wherein the first input end is coupled to a selected cell via a first data line, the second input end is coupled to a reference cell via a second data line, and the output end outputs a sensing data of the selected cell; and
a pre-charging circuit, coupled to the differential sensing amplifier, and the pre-charging circuit is configured to provide a pre-charging current and perform a pre-charging operation on the first data line,
wherein the first data line has a cell current and the pre-charging current, the second data line has a reference current, and the pre-charging current is determined according to the reference current, wherein the pre-charging current is greater than the reference current, and the pre-charging current is proportional to the reference current.

2. The current sensing circuit according to claim 1, wherein the differential sensing amplifier outputs an output voltage as the sensing data based on a comparison result of a sensing voltage and a reference voltage.

3. The current sensing circuit according to claim 1, further comprises:
a first current-to-voltage converter circuit, coupled between the first input end and the selected cell, is configured to convert the cell current and the pre-charging current into a sensing voltage.

4. The current sensing circuit according to claim 3, further comprises:
a second current-to-voltage converter circuit, coupled between the second input end and the reference cell, is configured to convert the reference current into a reference voltage.

5. The current sensing circuit according to claim 4, wherein the pre-charging circuit comprises:
a switch element, having a first end, a second end, and a control end, wherein the first end of the switch element is coupled to an operating voltage, and the control end of the switch element is coupled to a control signal.

6. The current sensing circuit according to claim 5, wherein the pre-charging circuit further comprises:
a current source, having a first end and a second end, wherein the first end of the current source is coupled to the second end of the switch element, and the second end of the current source is coupled to the differential sensing amplifier.

7. The current sensing circuit according to claim 5, wherein the current source comprises a first transistor, serving as a current mirror circuit, and the second current-to-voltage converter circuit comprises a second transistor.

8. The current sensing circuit according to claim 7, wherein the first transistor has a first end, a second end, and a control end, the first end of the first transistor is coupled to the switch element, the second end of the first transistor is coupled to the first input end of the differential sensing amplifier via the first current-to-voltage converter circuit, the control end of the first transistor is coupled to the second transistor.

9. The current sensing circuit according to claim 7, wherein the ratio of a channel width to a channel length of the first transistor is m times the ratio of a channel width to a channel length of the second transistor, wherein m is greater than or equal to 1.

10. The current sensing circuit according to claim 9, wherein the value of m is the ratio of a threshold value set for detecting current to the reference current.

11. The current sensing circuit according to claim 5, wherein the current source comprises a first transistor, serving as a current mirror circuit, and the second current-to-voltage converter circuit comprises a second transistor.

12. The current sensing circuit according to claim 11, wherein the first transistor has a first end, a second end, and a control end, the first end of the first transistor is coupled to the switch element, the second end of the first transistor is directly coupled to the first input end of the differential sensing amplifier, the control end of the first transistor is coupled to the second transistor.

13. The current sensing circuit according to claim 11, wherein the ratio of a channel width to a channel length of the first transistor is m times the ratio of a channel width to a channel length of the second transistor, wherein m is greater than or equal to 1.

14. The current sensing circuit according to claim 13, wherein the value of m is the ratio of a threshold value set for detecting current to the reference current.

* * * * *